Feb. 14, 1961   R. L. SAUVEE   2,971,632
CONVEYORS
Filed Nov. 13, 1956   2 Sheets-Sheet 1
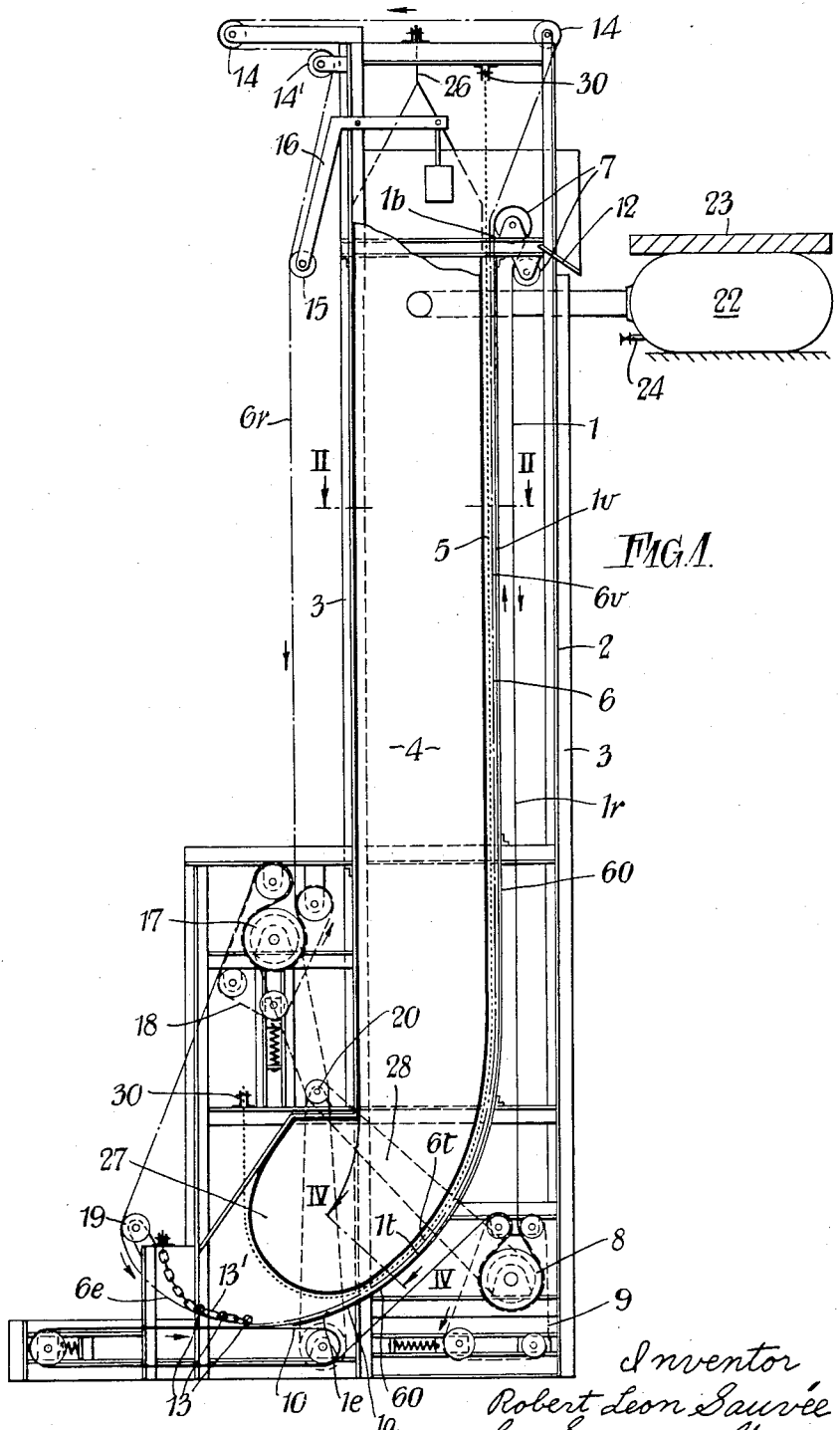
FIG.1.
Inventor
Robert Leon Sauvée
by Sommers & Young
Attorneys

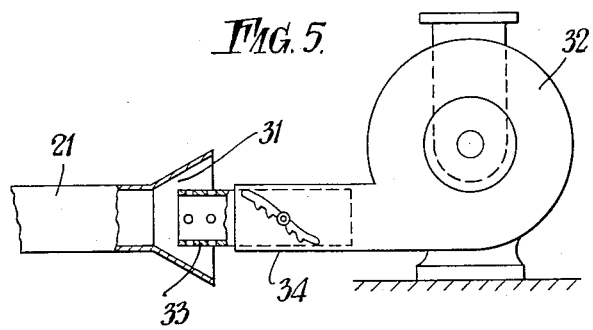
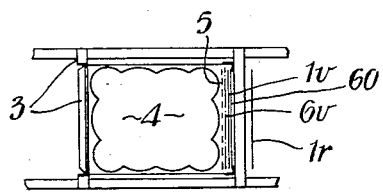
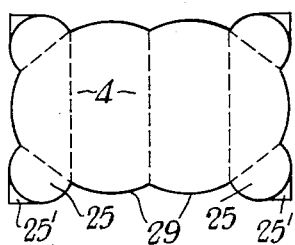
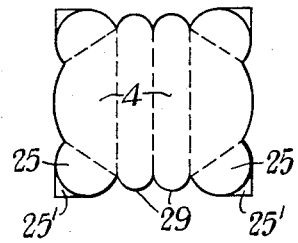

United States Patent Office 2,971,632
Patented Feb. 14, 1961

2,971,632
CONVEYORS

Robert Leon Sauvee, Erith, England, assignor to Sovex Limited, Erith, England

Filed Nov. 13, 1956, Ser. No. 621,733

Claims priority, application Great Britain Nov. 22, 1955

3 Claims. (Cl. 198—165)

This invention concerns improvements relating to conveyors of the endless band type, slat conveyors or conveyors comprising a combination of bands and slats. For convenience, the terms endless-band conveyor and band will hereinafter be used. The angle at which articles can be carried upwardly by a rising-band conveyor is limited and even the addition of a loading band bearing upon the articles does not permit of an angle of rise of about 60° being exceeded. An object of the present invention is to provide a band-conveyor arrangement by which articles or materials can be carried upwardly at a larger angle and even vertically. More particularly, it is intended that this should be possible with articles such as parcels and post-office sacks and even with articles of varying size and shape.

In a conveyor arrangement in accordance with the invention, articles or materials, hereinafter referred to as articles, being carried along by an inclined or vertical conveyor band are loaded by means of a fluid-filled flexible envelope which presses the articles against the band as they travel in contact therewith. Preferably the envelope is an inflated but comparatively flabby air bag. The bag may bear on the articles through a loading band which moves with the same speed as the conveyor band.

A preferred embodiment of the invention will now be more fully described by way of example and with reference to the accompanying drawings, in which:

Figure 1 is a somewhat diagrammatic side elevation of a conveyor arrangement,

Figure 2 is a cross section on the line II—II in Figure 1,

Figures 3 and 4 are cross sections through an air bag alone, taken at the lines II—II and IV—IV respectively, and Figure 5 is a side elevation, partly in section, illustrating a modification.

For the example to be described, it will be assumed that the conveyor is to carry articles, for example parcels and post-office sacks, vertically upwards. For this purpose, the vertical section 1v of the conveying flight of a main endless conveyor band 1 (indicated by a full line) is disposed towards the rear wall 2 of a rectangular trunk or trough made, for instance, of sheet metal supported by an external framework 3 (in Figure 1, the trunk is shown with the near wall removed). The front portion of the trunk is occupied by an inflated air bag 4 (indicated by a heavy line) which bears upon the conveying flight of the conveyor 1, and upon articles carried along by by the latter, through a wire-belt cover 5 (shown by a dotted line) and an endless co-acting loading band 6 (shown by a chain line).

In addition to their vertical sections 1v, 6v, the conveying or working flights of the bands 1 and 6 are arranged to present entry sections 1e, 6e and transition sections 1t, 6t following a smooth concave curve between the entry and vertical sections. The back of the band 1 is guided in its transition and vertical sections 1t and 1v against guide surfaces 60 of sheet metal. These surfaces back the band 1 between the points 1a and 1b.

The band 1 passes around pulleys 7 at the upper end of its conveying flight and is driven towards the lower end of its return flight 1r from a pulley 8 with the assistance of a tensioned driving band 9 (shown by a dashed line) wrapped around the band 1 where it encircles the pulley 8. The band 1 then passes around a driven and tensioned toe band 10 which tensions it and supports the entry section 1e in per se known manner. At the entry section, the band 1 is fed with articles and, at the pulleys 7, it discharges the articles on to a chute 12, whence they are carried away in any desired manner.

The vertical section 6v of the loading band 6 normally runs in contact with the vertical section 1v of the band 1 and its entry section 6e sags freely onto the entry section 1e of the latter in advance of the point of co-action with the air bag 4. This sagging entry section 6e may be loaded by a number of transverse metal rods or rollers 13 supported between lateral chains 13'. This arrangement facilitates the reception of articles between the bands 1, 6 and the ready provision of the slack required in the band 6 to accommodate even a large article. The band 6 passes around pulleys 14, 14' at the upper end to a jockey pulley 15 carried by counter-weighted levers 16. This arrangement maintains the loading band 6 under a required tension and at the same time affords a simple effective means for quickly and automatically taking up the aforesaid slack upon discharge of the article after it has travelled between the working flights of the bands 1, 6. The return flight 6r which, unlike the return flight 1r, travels outside of the trunk is driven, at a location beyond the tensioning means 15, 16, from a pulley 17 with the assistance of a tensioned wrapping band 18 (shown by a dashed line) and then passes around a forwardly set pulley 19 into the entry section 6e. As diagrammatically indicated, the bands 1, 6 and 10 are driven in unison from a common shaft 20.

The air bag 4 is made of a flexible but substantially non-stretching material which is capable of withstanding internal pressure, but which may be non-porous or possess a limited porosity, for example a rubberized fabric, synthetic plastic material, leather, canvas or the like. In the example illustrated, the bag is to be assumed to be non-porous and is connected by a duct 21 to a flexible overflow reservoir 22 loaded by a weight 23 and having a charging valve 24. This reservoir, whose capacity may suitably be about one fifth that of the air bag 4, may be located in any convenient position. The system will be maintained under a low internal pressure. Preferably, the pressure will be less than 10 lbs. per sq. ft. above atmospheric pressure. Generally about 4 lbs. per sq. foot will be suitable. The bag 4 should then be flabby and free to deform locally and progressively as an article is carried upwardly past it between the bands 1 and 6.

The bag 4 may be of a plain shape conforming substantially to the volume which it is to occupy in the vertical trunk or it may be of bellows formation. However, it may have a shape cross-section intended to facilitate local expansion and contraction and to minimise friction. The section illustrated in Figures 3 and 4 (which show the bag to a larger scale than Figure 2) is of generally oval shape, slightly constricted at the centre, and having rounded swellings 25 directed towards the corners of the trunk. These swellings may be furnished with sponge-rubber corner pieces 25'. The restoration of the shape of the bag after deformation may be assisted by internal perforated diaphragms, lacing or the like. The bag is suspended at 26 and may also be attached to the inside of the trunk at intervals and at its foot. Where the bag 4 is connected to the duct 21, it may be provided with a reinforcing annulus of metal.

To facilitate entry of articles between the band sections 1e, 6e, the foot 27 of the air bag 4 may be of circular or part-spiral shape in side elevation. The transition 28 to the straight vertical portion of the bag may then be constrained in part by the curved guide mentioned above and in part by a flexible but inextensible band wrapped around the foot 27 of the bag. In the transition portion, the centre panels 29 may be tapered and cut on the curve to reduce puckering. The extremity of the foot 27 is secured back to the front of the transition portion 28.

The belt 5, which is simply suspended by its ends at 30, prevents the air bag 4 from being worn or damaged by rubbing of the band 6 against the said bag. The belt should be highly flexible and present a large surface area in contact with the band 6. Woven wire conveyor belting made of close-woven high-tensile steel wire is suitable for the purpose. Alternatively, a belt of thin flexible metal, tough rubber or fabric material or the like or a flexible roller bed may be employed or the bag itself may be furnished with a reinforcing facing or protective layer.

The pressure exerted by the air bag 4 through the loading band 6 upon a sack, for example, enables the conveyor band 1 to carry the sack with it even in a vertical path. The flabbiness of the bag allows it to adapt itself by deformation to the shape of the article and to exert pressure on it in an enveloping fashion, the deformation and envelopment progressing up the bag as the sack is raised.

Various modifications may be made:

If a porous bag 4 is used, it will be permanently connected to an air compressor or air line by which the pressure in the bag is maintained constant at substantially the predetermined value. If necessary, the bag may deliberately be made leaky at one or more points to accentuate its flabbiness and freedom to deform. Leakage may, for example, be permitted at such a total rate that, say, 10 to 100 cu. ft. of air per sec. has to be supplied to the bag. The compressor may be made adjustable or automatically regulatable in its delivery. Alternatively use may be made of a centrifugal compressor designed to deliver at substantially constant pressure by virtue to the back leakage of air or "slip" which occurs in the compressor itself should a higher pressure tend to develop.

Finally, as illustrated in Figure 5, a deliberate leakage gap 31 may be provided between the compressor 32 and the duct 21. To facilitate adjustment of the pressure maintained in the bag 4, the gap may be made adjustable by means of a sleeve 33, preferably a perforated sleeve, slidable in the delivery passage 34 of the compressor. In this case also, substantially constant pressure will be maintained in the bag 4. If the pressure tends to rise, increased back leakage at the gap 31 will occur.

In conjunction with the arrangement 15, 16 for dealing with slack arising in the loading band 6 on the discharge of an article from between the bands 1 and 6, provision may be made for driving the band 6 separately from the other bands and controlling its speed in dependence upon the condition of the band. For instance, the band 6 may be driven at the same point as in Figure 1, but by a separate electric motor whose speed is variable and is controlled by a regulating device responsive to the tautness of the band between the pulleys 14, for example a regulating arm carrying a roller bearing on the top of the band. When an article is discharged from between the vertical flights 1v, 6v of the bands 1, 6, the resultant slackness will instantly be apparent in the adjacent section of band 6 between the pulleys 14 and the regulating device will respond in the direction for increasing the speed of the motor. Conversely, directly the slack has been eliminated, the motor speed will be reduced.

Instead of the loading band 6 being driven with the assistance of a wrapping band 18, it may be driven by a driving pulley around which it is carried and against which it is held by a spring-loaded mangling pulley.

The back of the conveying flight of the conveyor band 1 may be supported against a plurality of rollers. Alternatively it might be supported from another air bag in a manner similar to that in which the band 6 is supported from the bag 4.

I claim:

1. A conveyor arrangement comprising an endless conveyor band whose conveying flight has a rising conveyor section, a substantially horizontal entry section and a transition section between the said entry and rising sections, a fluid-filled flexible envelope which is arranged opposite the said rising section and extends into the said transition and entry sections for pressing the articles against the said conveyor band in all of the said sections, an endless loading band having an active flight located between said envelope and said conveyor band coacting with said conveying flight of said conveyor band in said entry section, said transition section, and said rising section, tensioning means operably connected with said loading band for promptly and automatically taking up slack in said loading band resulting from the discharge of articles from between the conveyor band and said loading band, and driving means directly contacting and driving said loading band at a point beyond the point where the articles are discharged.

2. A conveyor arrangement comprising an endless conveyor band whose conveying flight has a rising conveyor section, a substantially horizontal entry section and a transition section between the said entry and rising sections, a fluid-filled flexible envelope which is arranged opposite the said rising section and extends into the said transition and entry sections for pressing the articles against the said conveyor band in all of the said sections, a loading band having an active flight located between said envelope and said conveyor band, driving means directly contacting and driving said loading band at a location beyond said active flight, tensioning means operably connected with said loading band at a point between said active flight and said driving means for taking up slack in said loading band promptly and automatically upon discharge of a conveyed article from said conveyor band, said loading band having a slack section beyond said driving means, enclosing an end portion of said envelope and sagging freely away from said envelope and co-acting with the conveyor band at said entry and transition sections.

3. An endless-band conveyor arrangement having a steep conveying flight and an entry section at an angle thereto and comprising an endless conveyor band, an inflatable flexible envelope arranged opposite the said flight for pressing the articles being conveyed against the said band, and means for supplying fluid under pressure constantly to the envelope and for permitting it constantly to escape therefrom whereby a substantially constant pressure is maintained on the conveyor or band by the said flexible envelope in spite of the deformation of the envelope due to the presence of articles being conveyed.

References Cited in the file of this patent

UNITED STATES PATENTS

| | | |
|---|---|---|
| 574,444 | Nickerson | Jan. 5, 1897 |
| 2,254,116 | Cooper et al. | Aug. 26, 1941 |
| 2,774,462 | Poundstone | Dec. 18, 1956 |

FOREIGN PATENTS

| | | |
|---|---|---|
| 508,541 | Germany | Sept. 27, 1930 |
| 547,416 | Germany | Aug. 23, 1932 |